(12) United States Patent
Brudeli

(10) Patent No.: US 7,530,419 B2
(45) Date of Patent: May 12, 2009

(54) THREE WHEELED VEHICLE

(75) Inventor: Geir Brudeli, Hokksund (NO)

(73) Assignee: Brudeli Tech Holding AS, Ovre Eiker (NO)

( * ) Notice: Subject to any disclaimer, the term of this patent is extended or adjusted under 35 U.S.C. 154(b) by 293 days.

(21) Appl. No.: 10/563,127

(22) PCT Filed: Jun. 29, 2004

(86) PCT No.: PCT/NO2004/000197

§ 371 (c)(1),
(2), (4) Date: Jun. 28, 2006

(87) PCT Pub. No.: WO2005/002957

PCT Pub. Date: Jan. 13, 2005

(65) Prior Publication Data

US 2007/0176384 A1 Aug. 2, 2007

(30) Foreign Application Priority Data

Jul. 1, 2003 (NO) .................................. 20033026

(51) Int. Cl.
*B62D 61/06* (2006.01)
*B60G 21/00* (2006.01)
(52) U.S. Cl. ............................... 180/210; 280/124.103; 280/124.109
(58) Field of Classification Search ................. 180/210; 280/124.103, 124.109
See application file for complete search history.

(56) References Cited

U.S. PATENT DOCUMENTS 4,020,914 A    5/1977  Trautwein
4,088,199 A *  5/1978  Trautwein .................... 180/209
4,360,224 A   11/1982  Sato et al.
4,685,690 A *  8/1987  Fujita et al. ............ 280/124.103
5,762,351 A *  6/1998  SooHoo ...................... 280/267
5,765,846 A    6/1998  Braun
6,547,027 B1* 4/2003  Kalhok et al. ................ 180/312
6,763,905 B2* 7/2004  Cocco et al. ................. 180/210
2006/0255550 A1* 11/2006  Pfeil et al. ............... 280/5.509

FOREIGN PATENT DOCUMENTS

DE       3546073 A1 *  7/1987
WO    WO 01/92084 A1   12/2001

* cited by examiner

*Primary Examiner*—John Q. Nguyen
*Assistant Examiner*—Nicole Verley
(74) *Attorney, Agent, or Firm*—Finnegan, Henderson, Farabow, Garrett & Dunner, L.L.P.

(57) ABSTRACT

The present invention relates to a three-wheeled vehicle comprising a frame with engane, drive gear and at least one driven wheel at the rear, and two front wheels which are used in part to steer the vehicle. The vehicle can also be steered in that the frame with engine, drive gear and the driven rear wheel can be banked over to the side like a motorcycle. The present invention relates in particular to a design which helps to move the centre of gravity when such a vehicle is tilted to the side so that, inter alia, it is easier to right the vehicle. Furthermore, the present invention makes it possible to affect and determine the driving characteristics of the vehicle by varying different design parameters within the scope of the present invention. The invention also relates to a special design for the mounting of footboards on which the driver of the vehicle can place his/her feet when driving the vehicle. The special design according to the invention contributes actively to changing the geometry between the footboards and the frazne of the vehicle when the vehicle is used and especially where it is "tilted" to the side to steer the vehicle.

16 Claims, 8 Drawing Sheets

THREE WHEELED VEHICLE

The present invention relates to a three-wheeled vehicle having a frame, engine, drive gear and at least one driven wheel at the rear and two front wheels that are partly used to steer the vehicle. The vehicle may also be steered in that the frame with engine, drive gear and the driven rear wheel can be banked over to the side like a motorcycle. Such vehicles are thus moved by tilting the vehicle from side to side. Vehicles of this type are therefore open referred to as "tilters", which is a well-known designation. The present invention relates in particular to a design which helps to move the centre of gravity when a vehicle of this kind is tilted to the side so that, inter alia, it is easier to right the vehicle. Furthermore, the present invention provides ways of affecting and determining the driving characteristics of the vehicle by varying different design parameters within the scope of the present invention. The present invention also relates to a special design for the mounting of footboards on which the driver of the vehicle can rest his/her feet when driving the vehicle. The special design according to the present invention contributes actively to changing the geometry between the footboards and the vehicle frame when the vehicle is used, and especially when it is "tilted" to the side to steer the vehicle.

Various designs of three-wheeled vehicles are previously known. These include a solution involving the mounting of footboards that is known from U.S. Pat. No. 4,088,199 and U.S. Pat. No. 4,020,914 in the name of Trautwein, and a solution for support and parking that is known from U.S. Pat. No. 4,697,663, also in the name of Trautwein. From WO 01/92084 in the name of Aprilia there is also known a design for steering and suspension in connection with two front wheels which can both be "banked over" in a turn and at the same time can be steered by rotation about their respective points of suspension.

When a three-wheeled vehicle of the type discussed here is "banked over" in a turn, the tilting point (pivot point) for the vehicle is a line along the grounds under the vehicle, on which line, inter alia, the rear wheel will be located. In a motorcycle with two wheels, this line pivot point) will be along the ground and both the front wheel and the rear wheel will be on the line. The vehicle's centre of gravity is located in the frame of the vehicle and so when the vehicle is banked over, the centre of gravity moves normally along an arc the centre of which is on the ground. The ground clearance of the vehicle is at all times defined as the distance between the lowest point of the frame and the ground. Thus, when the vehicle moves along an arc (transverse to the longitudinal direction), the ground clearance is reduced. In addition, it will be necessary to provide a righting moment in order to bring the vehicle back along the arc and up to a neutral position (essentially vertical) when the turn has been completed.

In the case of a three-wheeled vehicle, the relationship between ground clearance and movement of the centre of gravity is the same as in a two-wheeled motorcycle.

This is illustrated in later figures. Thus, three-wheeled vehicles are also beset by the same problems as regards ground clearance and righting moment.

In view of the aforementioned problems, it is therefore an object of the present invention to provide a design that affects the driving characteristics of the vehicle by having an effect on the movement of the centre of gravity when the vehicle is tilted to the side about its axis of rotation, and at the same time reduces the righting moment that must be provided by the driver. The driver will find such a vehicle easier to handle, in part because it is easier to right up after it has been tilted over in a turn. At the same time, increased ground clearance (that the ground clearance is maintained as high as possible even when the vehicle is tilted to the side) will allow the vehicle to be used in other conditions, on more uneven ground etc. Not least, the vehicle will be capable of being banked even further before ground clearance and righting moment become a difficult situation for the driver to handle.

Furthermore, there is a desire to be able to equip a three-wheeled vehicle according to the present invention with footboards on each side of the vehicle. Such footboards can be used for both the driver and passenger, if there is one, and contribute to both enhanced comfort during driving and increased safety. However, if the footboards are fixed to the frame, they will be an element of the vehicle that follows the movement of the frame when the vehicle is banked over in a turn. Such a design thus contributes to reduced ground clearance and gives the driver the feeling that the footboard is less safe to stand on.

It is therefore an object of the present invention to provide a structural solution for the mounting of footboards preferably on each side of the vehicle, which footboards do not follow the rotational motion of the vehicle frame to the sides when the vehicle is banked. Furthermore, in a preferred embodiment it is an object that the outermost footboard should be raised slightly when the vehicle is banked. This gives the driver a greater possibility of applying a righting moment by placing his weight on his outermost leg (as in a Telemark turn), whilst the innermost footboard does not "fall down" in the turn.

The result is that the ground clearance is maintained and the driver can more easily keep his balance at low speed and keep his balance when one or more wheels skid against the ground. Furthermore, the footboards can be used during driving to actively affect the vehicle by banking the vehicle at an angle greater than that at which centrifugal and gravitational forces balance each other. This is in order to be prepared for a skid or the like. Furthermore, banking the vehicle at an angle greater than that at which centrifugal and gravitational forces balance each other to be able to have more weight on one front wheel than on the other in order to better be able to steer/right the vehicle. In particular at the start of a turn. The footboards can also be used in a turn where the vehicle is banked at its maximum lean angle and gravitational and centrifugal forces balance each other, where the only way of driving faster through the turn is to put force on the outer footboard and press/hold the vehicle down through the turn.

One of the ways in which the objects of the present invention are attained is by the introduction of a so-called transfer frame that is located centrally in the vehicle structure. Thus, a three-wheeled vehicle according to the present invention comprises a frame with engine, drive gear and a driven wheel at the rear, and two front wheels that are positioned respectively on each side of the front of the vehicle. The front wheels are each suspended by a wheel suspension having two transversal bars (preferably A-bars) arranged above each other, which transversal bars are pivotally attached to the front part of the vehicle frame at an upper and a lower level. The vehicle also has at its front end a forward frame member. According to the present invention, the vehicle is characterised in that at the front part of the vehicle there is provided a transfer frame having a longitudinal frame member parallel to the longitudinal direction of the vehicle frame, on which longitudinal frame member there is provided a spring anchor, preferably on each side of the longitudinal axis of the transfer frame. Connected to the spring anchor, on each side of the longitudinal direction of the vehicle, is a spring means that is also connected to at least one of the transversal bars on the same side. The longitudinal frame member of the transfer frame is also pivotally attached to the aforementioned forward frame member of the vehicle frame at a distance from the pivotal attachment of the transversal bar at the lower level either above or below the pivotal attachment. In the preferred embodiment, this pivotal attachment is also above the longitudinal rotation centre line of the vehicle as this provides a movement pattern for the vehicle that is in accordance with the object, where the vehicle's centre of gravity follows a flattened curve when the vehicle is banked over in turns. This flattened curve is obtained in that the vehicle frame is "lifted" by the transfer frame through the rotational motion when the vehicle is banked over in a turn Moreover, in the preferred embodiment, a damping means in the form of a shock absorber is provided in connection with the spring means. This is preferred in order to safeguard the driving characteristics and is a commonly known technical feature.

In one embodiment, the pivotal attachment of the transfer frame to the said forward frame member (which is a part of the vehicle frame) is also variable so that it is possible to vary the characteristics of the vehicle according to desire and need. This may, for example, be done by providing a plurality of pivot points in the forward frame member or in the transfer frame so that the pivot point can be moved.

In another embodiment a servo or power amplifier is provided that supplies a torque or a force which, in a preferred embodiment, is essentially almost proportional to the torque or the force that is transferred from the footboards to the transfer frame.

Furthermore, in another embodiment a spring device may be provided between the main frame of the vehicle and the transfer frame. The force from the spring can be used to both stabilise and destabilise the vehicle, depending upon what is desirable. Examples will include the combination of substantial ground clearance and not such great balance of forces, which can be provided by the said spring or springs between the main frame and the transfer frame.

The present invention also relates to a three-wheeled vehicle equipped with footboards in order to meet the aforementioned object. Such a vehicle according to the present invention comprises a frame with engine, drive gear and a driven wheel at the rear, and two front wheels which are positioned respectively on each side of the front of the vehicle. The front wheels are each suspended by a wheel suspension having two transversal bars arranged above each other, which transversal bars are pivotally fastened to the front part of the vehicle frame at an upper and a lower level. The vehicle also has at its front end a forward frame member. The vehicle is also provided on each side with a footboard. According to the present invention, the vehicle is characterised in that at the front part of the vehicle there is provided a transfer frame having a longitudinal frame member parallel to the longitudinal direction of the vehicle frame, on which longitudinal frame member there is provided a spring anchor, preferably on each side of the longitudinal axis of the transfer frame. Connected to the spring anchor on each side of the longitudinal direction of the vehicle is a spring means which is also connected to at least one of the transversal bars on the same side. The longitudinal frame member of the transfer frame is also pivotally attached to the aforementioned forward frame member of the vehicle frame at a distance from the pivotal attachment of the transversal bar at the lower level either above or below the pivotal attachment. In the preferred embodiment, this pivotal attachment is also above the longitudinal rotation centre line of the vehicle as this provider a movement pattern for the vehicle that is in accordance with the object, where the vehicle's centre of gravity follows a flattened curve when the vehicle is banked over in turns. This flattened curve is obtained in that the vehicle frame is "lifted" by the transfer frame through the rotational motion when the vehicle is banked over in a turn. According to the present invention, the footboards are also pivotally attached to the vehicle frame about its longitudinal axis, and each of the footboards on its respective side is connected to the transfer frame. In the preferred embodiment, the point of connection on the transfer frame is raised by means of a spacer, and furthermore the connection between each of the footboards and the transfer frame is also formed via a bar which together with the spacer forms an articulated connection. This articulated connection gives variable connection length between the transfer frame and the footboard when the vehicle frame is banked over to the side. This is due essentially to the distance between the attachment of the transfer frame and the forward frame member of the vehicle frame.

In additional embodiments, the footboards and the transfer frame may be formed of one piece or of several connected pieces. If the footboards and the transfer frame are formed of several connected pieces, these pieces can be directly connected or indirectly connected through other elements, as for instance the main frame.

One embodiment of the present invention is also shown in the attached figures, wherein.

Figure 1:
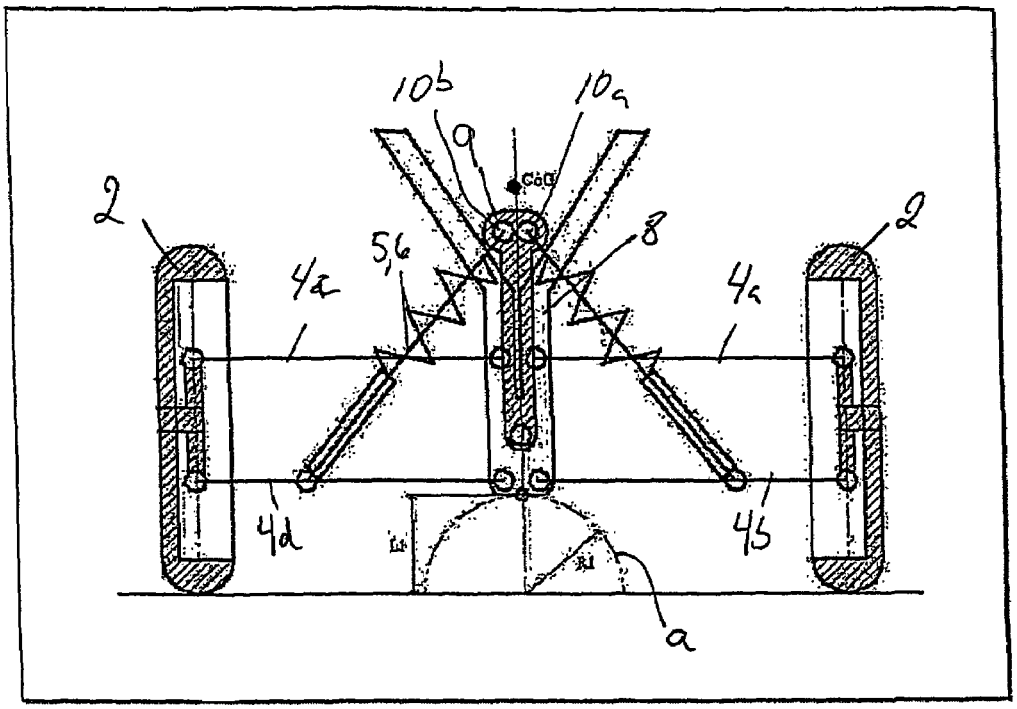
FIG. 1 is a front plan view of the movement of the centre of gravity of a three wheeled vehicle.

FIG. 1 is a schematic front plan view of a vehicle according to the present invention. The figure also illustrates the normal movement of the centre of gravity by means of the curve a. In addition, the ground clearance L1 is illustrated. The vehicle consists of a frame having a forward frame member 8 provided with an engine, drive gear, rear wheel suspension etc. (not shown). Furthermore, the front wheels 2 are positioned on each side and are connected to the frame 8 via two transversal bars on each side 4a-4d. In addition, according to the present invention, there is provided a transfer frame in the longitudinal direction of the vehicle having a perpendicular frame member 9. Spring anchors 10a, 10b are provided on this frame member for mounting springs 5 and preferably damping means 6. In the illustrated embodiment, the opposite end of the spring/damping means is fastened to the lower transversal bars 4b, 4d. The figure also shows how the transfer frame is attached at point 14 which is at a distance above the rotational centre of the main frame and the forward frame member 8.

Figure 2:
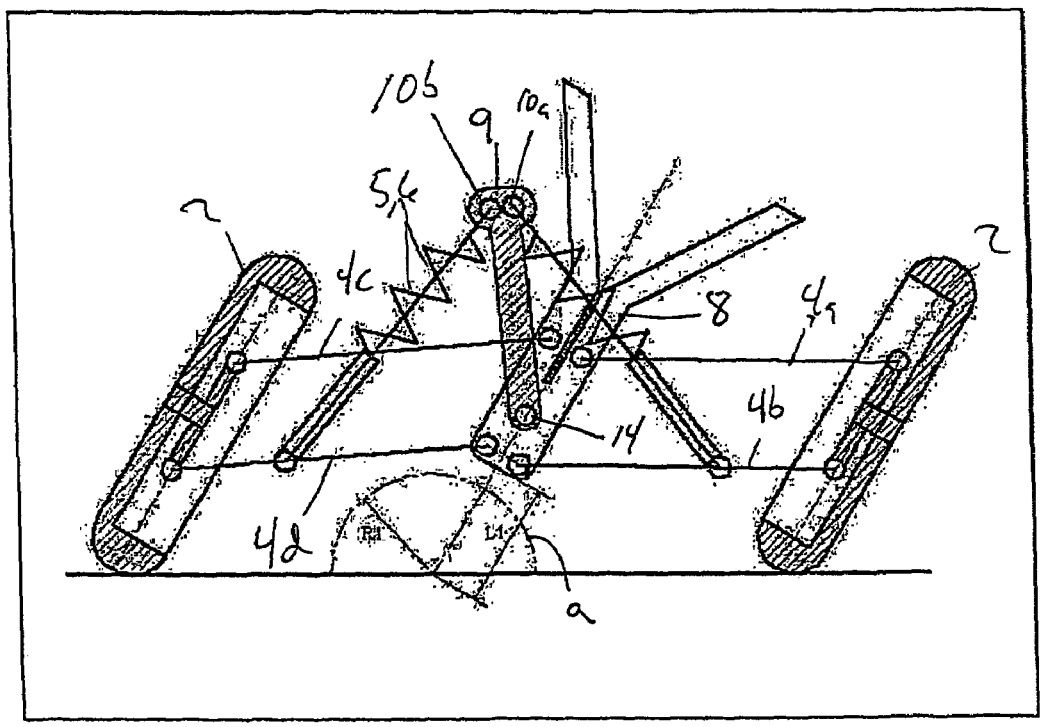
FIG. 2 is a front plan view of the movement of a three-wheeled vehicle according to the invention.

As shown in FIG. 2, the vehicle has been banked over towards one side. It can be seen clearly from the figure that the transfer frame with the perpendicular member 9 does not follow the movement of the main frame, but remains essentially vertical. Thus, the spring length on each side is essentially unchanged. Furthermore, it can be seen clearly that the lower edge of the vehicle does not follow the curvilinear movement a and the length L1 has increased. This is due to the centre displacement between the rotational centre of the main frame and the attachment 14 of the transfer frame.

Figure 3:
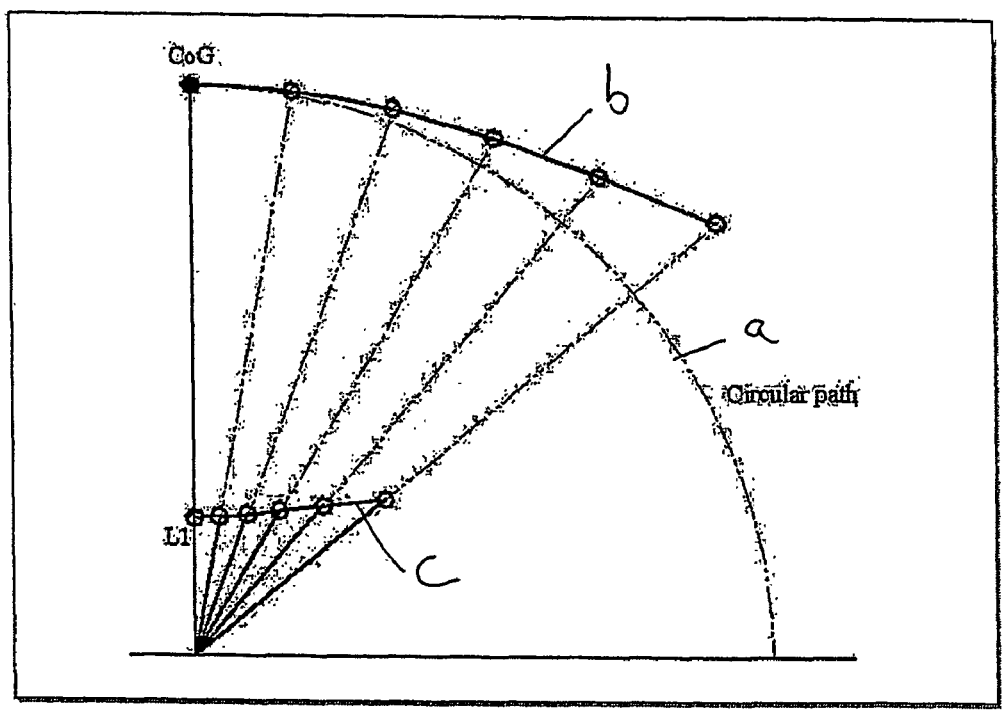
FIG. 3 is a schematic illustration of the movement of the vehicle's centre of gravity in a vehicle according to the invention.

Furthermore, FIG. 3 shows schematically how the movement of the centre of gravity follows a flattened path b instead of the usual path a as a result of the centre displacement of the attachment 14 of the transfer frame on the forward frame member 8 of the vehicle's main frame. In addition, the ground clearance L1 is shown along the curve c. It can be seen clearly that the transfer frame lifts the main frame during the tilting motion to the side. This is in accordance with the object of the present invention.

Figure 4:
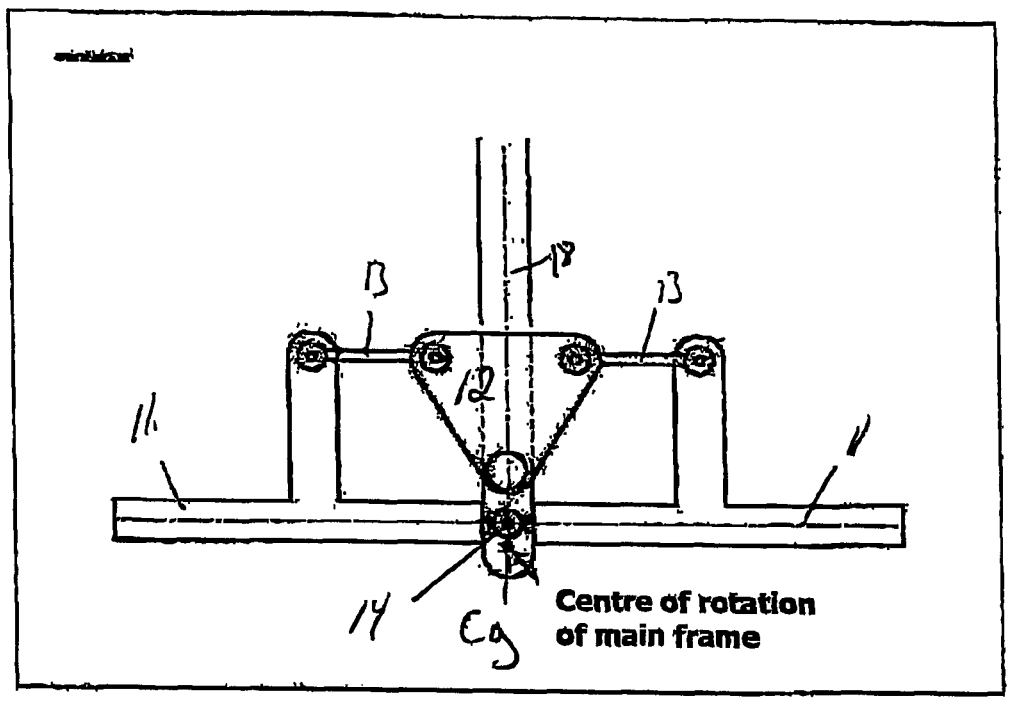
FIGS. 4 and 5 show an embodiment of the vehicle according to the invention fitted with footboards.
Figure 5:
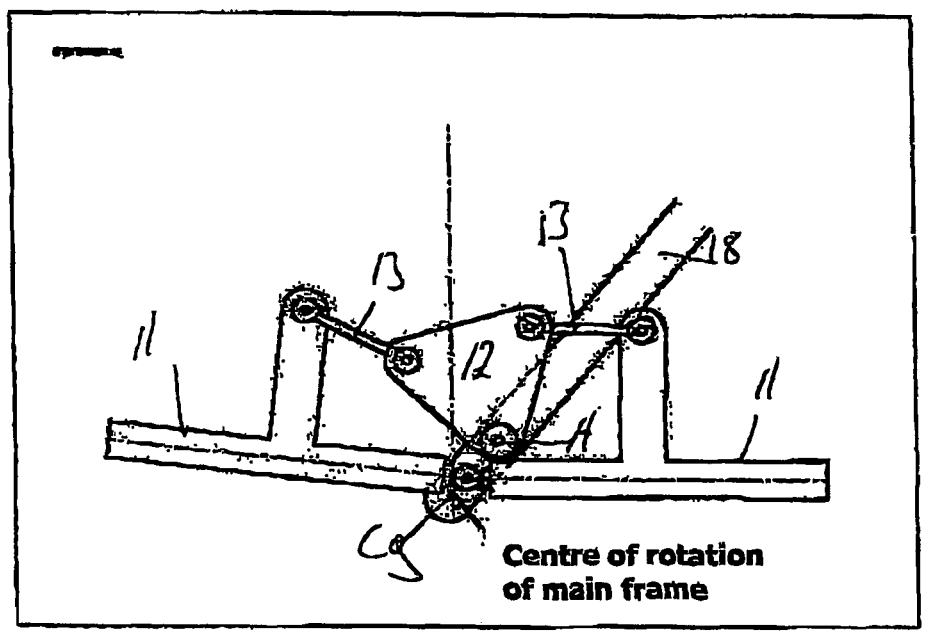

FIGS. 4 and 5 illustrate the mounting of the footboard 11 on each side of the vehicle, according to the present invention. A perpendicular part 18 of the main frame is shown in FIG. 4 in the position where the frame is upright in "neutral" position. In FIG. 5 the main frame has been banked over to one side and the frame member 18 follows therewith. The triangular connection 12 forms a part of the transfer frame as indicated in FIGS. 1 and 2, and, as shown, this remains in an almost vertical position when the main frame in FIG. 5 is baked over to the side. It is also shown how the transfer frame is attached via the frame member 12 at point 14 to the frame member 18 that is perpendicular to the longitudinal direction of the main frame. When the main frame banks in FIG. 5, the point of attachment 14 of the transfer frame moves. At the same time, the transfer frame 12 is connected to each of the footboards 11 by an upward projecting bar on the footboards 11 via a connection 13. When the pivot point 14 is moved, the total distance from 14 to the attachment between 13 and the footboard bar is so short that the footboard 11 on the side opposite the side to which the vehicle frame is banked is lifted slightly in accordance with the object of the present invention. The raising of one of the footboards is, like the above, also due to the fact that the centre 14 for the attachment of the transfer frame is displaced from the central axis of rotation of the main frame.

Figure 6:
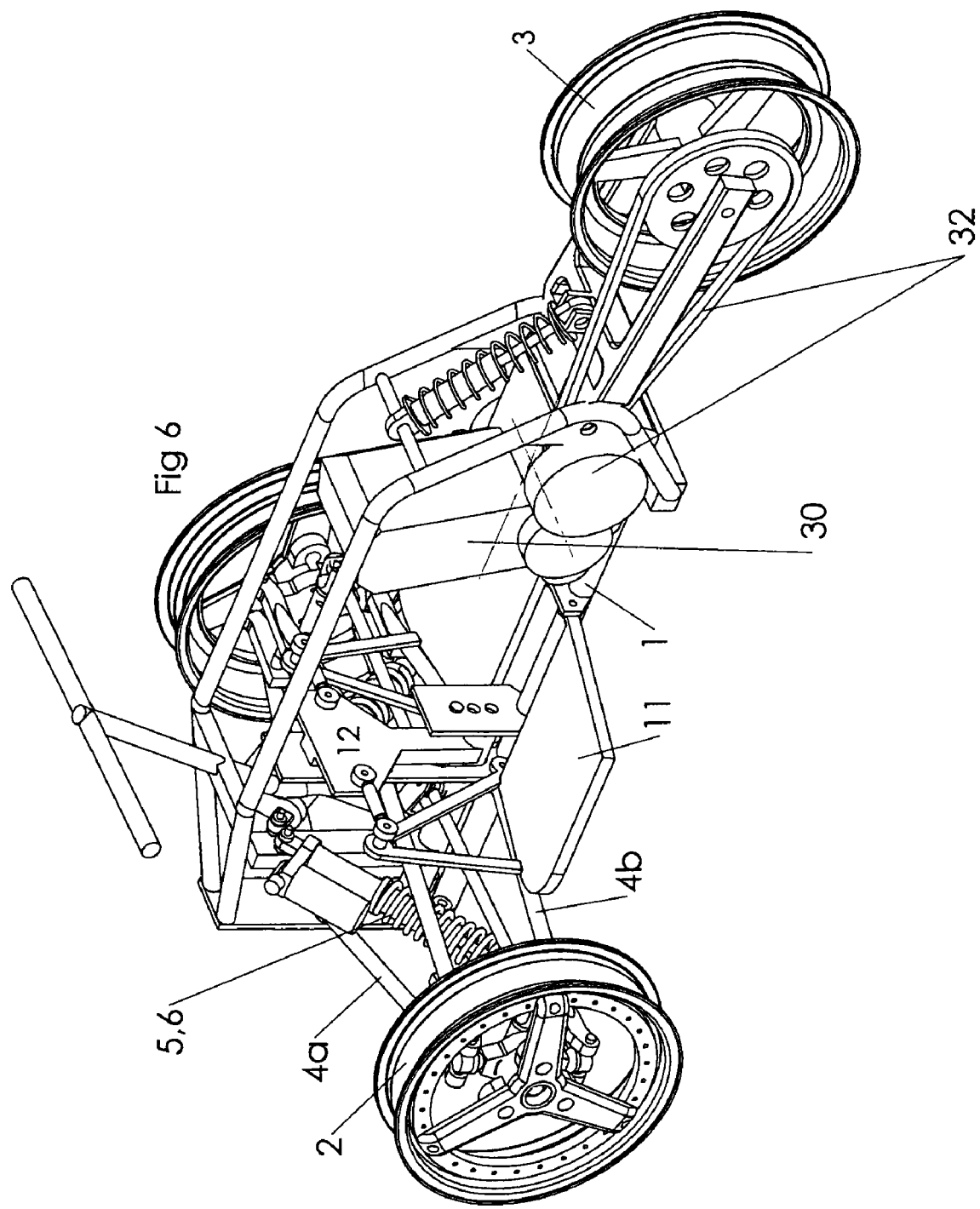
FIG. 6 is an oblique perspective view—looking from behind—of a simplified embodiment of a vehicle according to the present invention.

FIGS. 6-10 all show an embodiment of a vehicle according to the present invention. In FIG. 6. the vehicle has a frame 1 with a driven rear wheel 3. It includes an engine 30 and drive gear 32. In FIGS. 7-10 a number of the elements have been removed to render the figures clearer. The vehicle also has two front wheels 2 which are both supported by two transversal bars 4a-4d respectively. A-bars are shown in the figures. According to the invention, the frame 1 has at its forward part a perpendicularly arranged frame member 8. A transfer frame 7 is also provided above the frame 1, according to the invention. The transfer frame 7 has a perpendicular forward frame member 9, on which spring anchors 10a, 10b are provided for spring and damping means 5, 6 on each side of the vehicle. The spring and damping means 5, 6 are on their respective sides also connected at their other end to one or more of the transversal bars 4a-4d.

Figure 7:
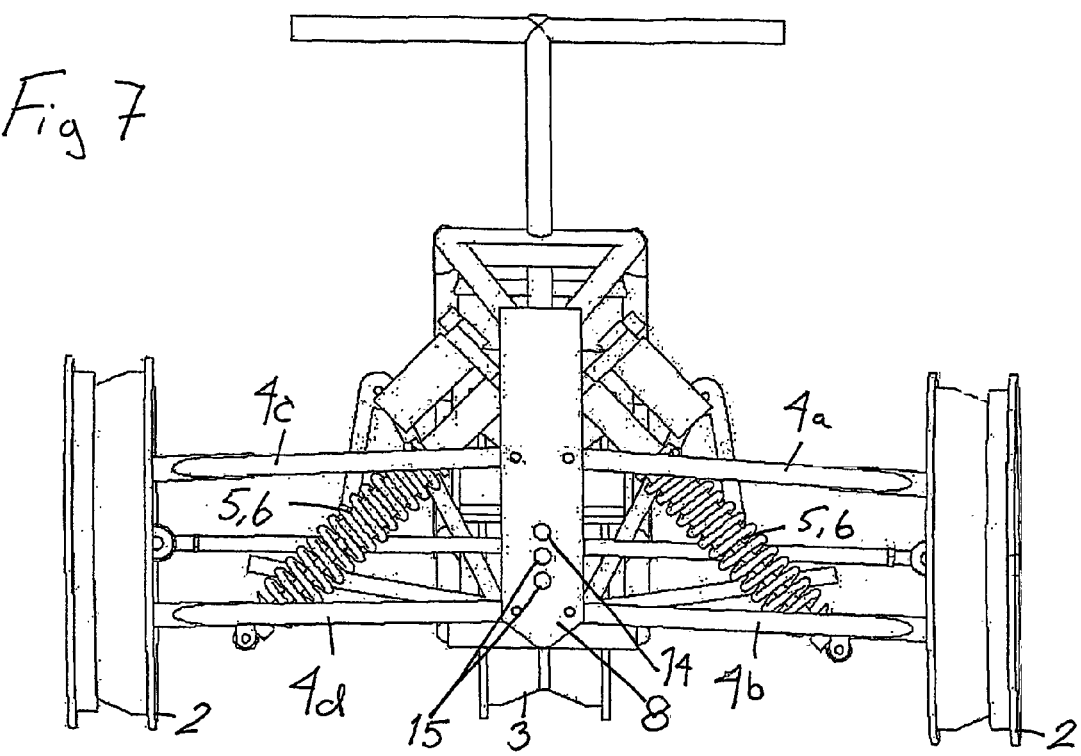
FIG. 7 is a front plan view of a simplified embodiment of a vehicle according to the present invention as shown in FIG. 6.
Figure 8:
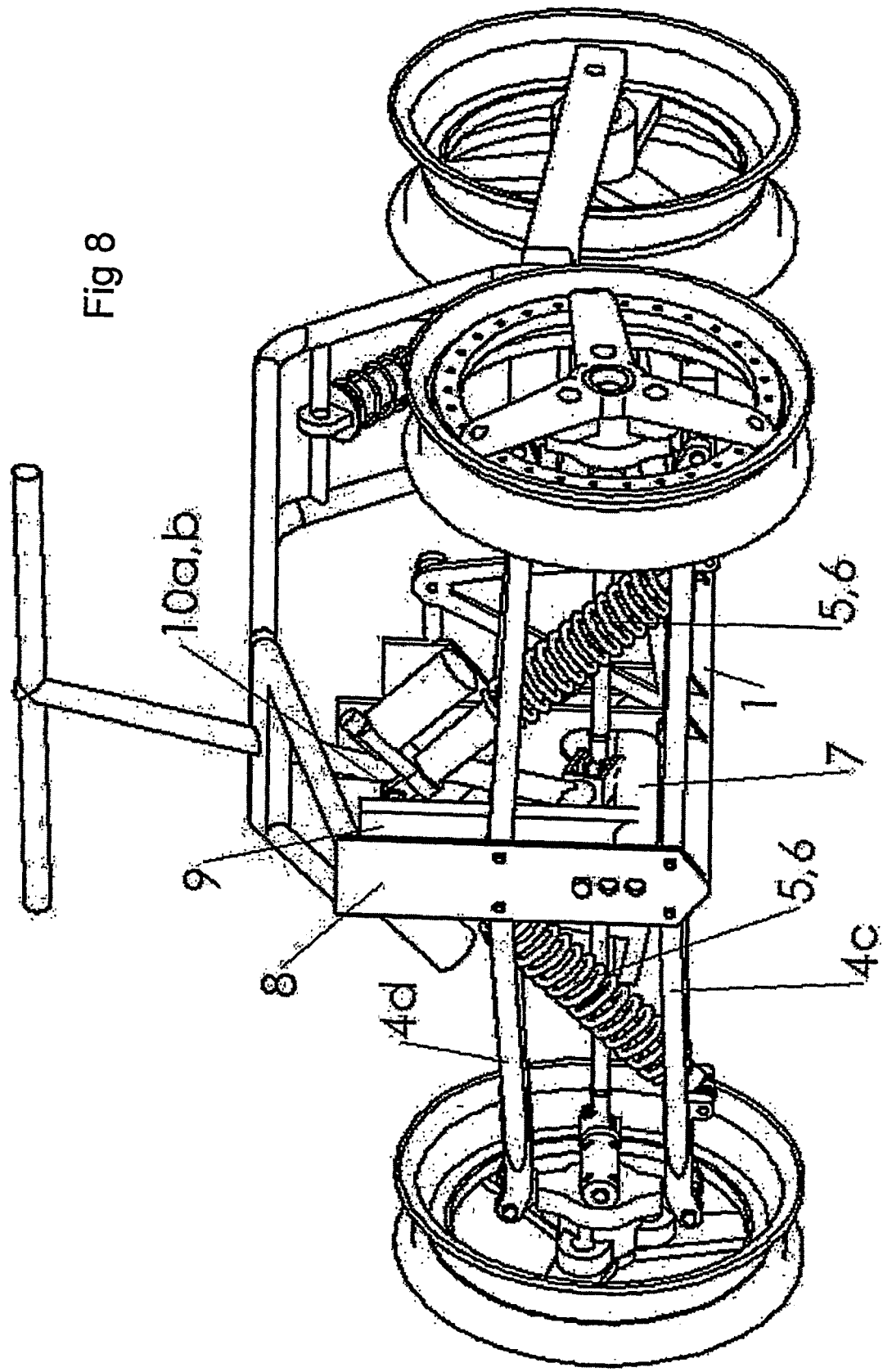
FIG. 8 is a front perspective view of a simplified embodiment of a vehicle according to the invention as shown in FIGS. 6-7.

In FIGS. 6, 7 and 8, the vehicle is placed with the steering means in neutral position and the vehicle is not tilting to the side. In these figures it can be seen that the perpendicularly arranged forward frame member 8 of the frame 1 is parallel to the perpendicular frame member 9 of the transfer frame 7. The frame 1 and the perpendicular frame member 8 will be rotatable between the different sides whereupon the vehicle frame with rear wheel, engine and drive gear are also banked over. Independent of this, the transfer Same will maintain an almost vertical position.

Figure 9:
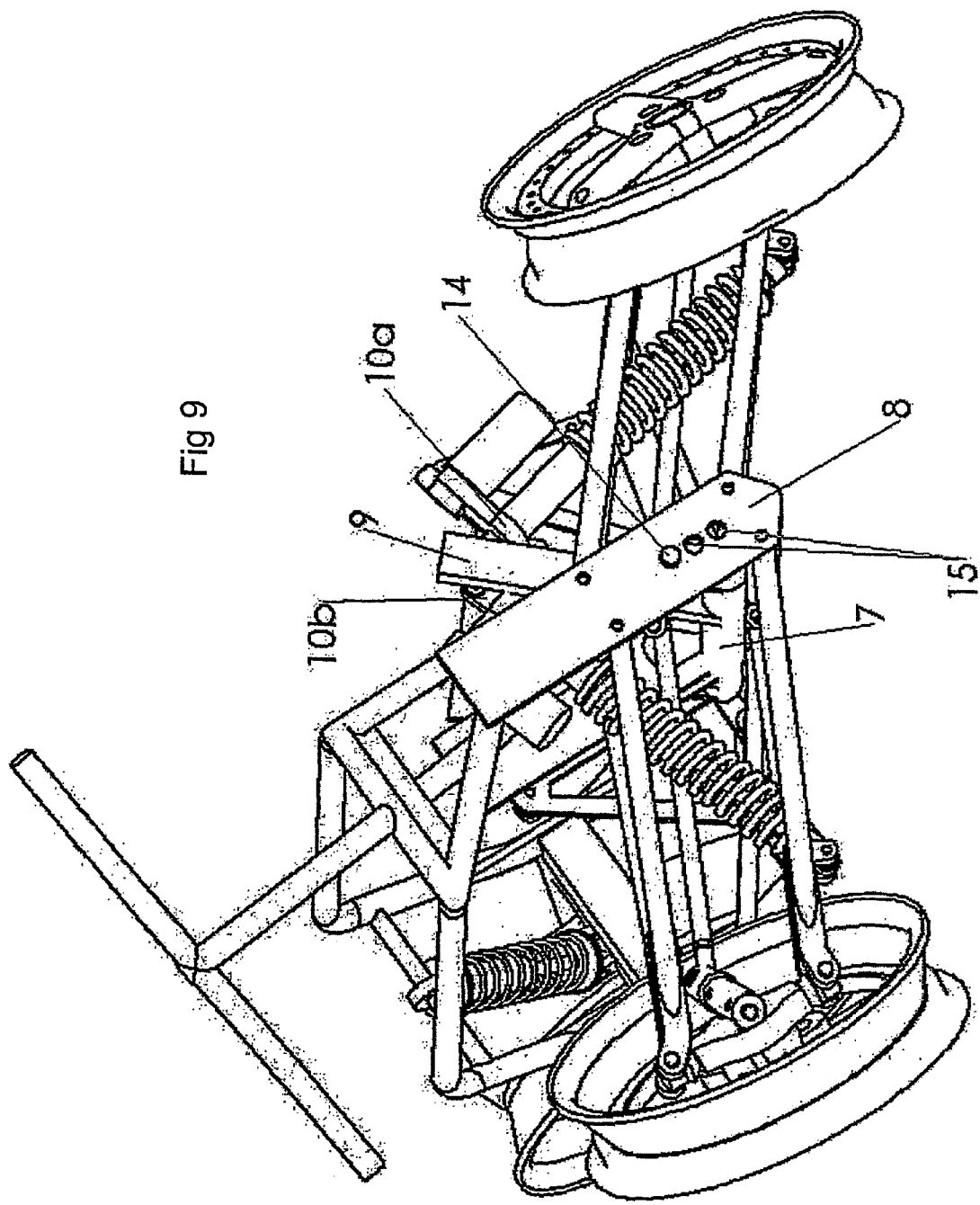
FIG. 9 is a perspective view—essentially from in front—of a simplified embodiment of a vehicle according to the invention as shown in FIGS. 6-8, when the vehicle turns and banks.

FIG. 9 is a perspective front view of a vehicle according to the present invention. The figure is a particularly good illustration of the different points of attachment 15 for the pivot point 14 between the transfer frame and the longitudinal rotational axis of the vehicle. Furthermore, the figure illustrates how the front wheels also bank together with the main frame, in part with the aid of the transversal bars 4a-4d.

Figure 10:
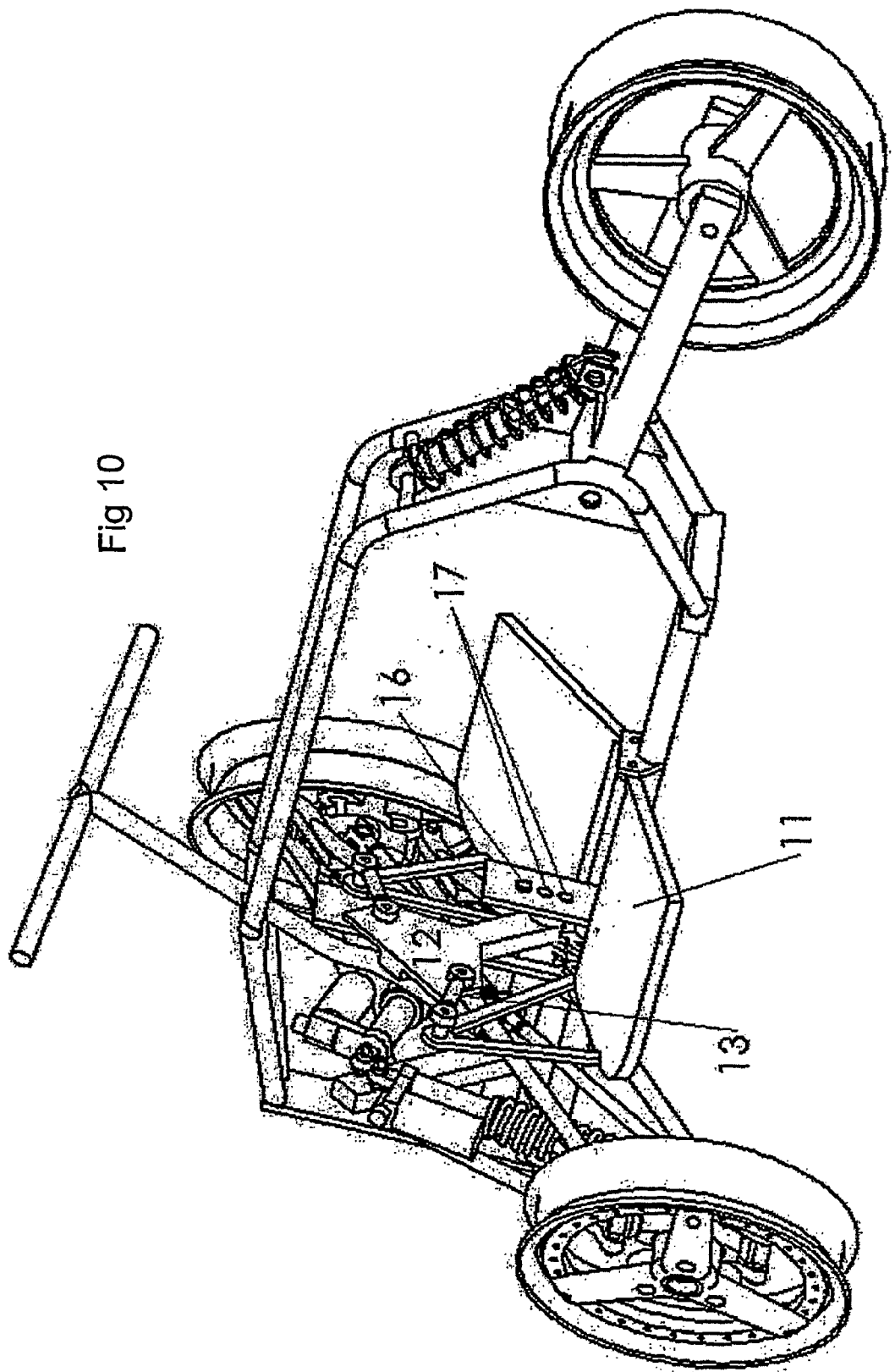
FIG. 10 is a rear perspective view of a simplified embodiment of a vehicle according to the present invention as shown in FIG. 9, when the vehicle turns and banks.

Furthermore, FIG. 10, like FIGS. 4 and 5, shows the attachment of the footboards 11 to the frame member 12 connected to the transfer frame and the connection 13 between the upward projecting bar of the footboard and the connection 13.

FIG. 10 also shows different points of attachment 17 for the pivotal connection 16 between the transfer frame and the main free of the vehicle in order to vary the distance between the point of attachment 16 and the longitudinal axis of rotation of the vehicle.

It is obvious from several of the figures that the transfer frame 7 is secured at its front at point 14 and at its rear end at point 16. If the points of attachment are moved to the alternatives 15 and 17, the distance between the pivot point 14, 16 and the longitudinal axis of rotation of the main frame will be altered, which substantially affects the driving characteristics.

The invention claimed is:

1. A three-wheeled vehicle comprising a frame with engine, drive gear and at least one driven wheel at the rear, and two front wheels respectively on each side of the front of the vehicle, each of the front wheels being suspended by a wheel suspension having two transversal bars arranged above each other, which transversal bars are pivotally secured to the frame at an upper and lower level, the vehicle at its front end having a forward frame member, wherein at the front part of the vehicle there is provided a transfer frame having a longitudinal frame member parallel to the longitudinal direction of the vehicle frame, on which longitudinal frame member there is provided a spring anchor, in which spring anchor on each side of the longitudinal direction of the vehicle there is connected a spring means which also is connected to at least one of the transversal bars on the same side, which longitudinal frame member of the transfer frame is pivotally attached to the forward frame member at a distance from the longitudinal rotation centre line of the vehicle.

2. The vehicle to claim 1, wherein the longitudinal frame member of the transfer frame is pivotally attached to the forward frame member at a distance above the longitudinal rotation centre line of the vehicle.

3. The vehicle according to claim 1, wherein the longitudinal frame member of the transfer frame is pivotally attached to the forward frame member at a distance below the longitudinal rotation centre line of the vehicle.

4. The vehicle according to claim 1, wherein there is provided a damping means in connection with the spring means.

5. The vehicle according to claim 1, wherein the spring anchor is located in an upper region of the longitudinal frame member.

6. The vehicle according to claim 1, wherein the attachment of the transfer frame to the main frame can be varied in predefined holes.

7. The vehicle according to claim 1, wherein the transversal bars are A-bars.

8. The vehicle according to claim 1, wherein there is provided one or more spring devices between the main frame and the transfer frame.

9. A three-wheeled vehicle comprising a frame with engine, drive gear and at least one driven wheel at the rear, and two front wheels respectively on each side of the front of the vehicle, each of the front wheels being suspended by a steel suspension having two transversal bars arranged above each other, which transversal bars are pivotally secured to the frame at an upper and a lower level, the vehicle at its forward end having a vertical frame member, the vehicle being provided on each side with a footboard, wherein at the front part of the vehicle there is in addition provided a transfer frame having a longitudinal frame member parallel to the longitudinal directional of the vehicle frame, on which longitudinal frame member there is provided a spring anchor, to which spring anchor on each side of the longitudinal direction of the vehicle there is connected a spring means which also is connected to at least one of the transversal bars on the same side, the longitudinal frame member being pivotally attached to the forward frame member at a distance from the longitudinal rotation centre line of the vehicle, and the footboards being pivotally attached to the vehicle frame about its longitudinal axis, and that each of the footboards on its respective side is connected to the transfer frame.

10. The vehicle according to claim 9, wherein the longitudinal frame member of the transfer frame is pivotal attached to the forward frame member at a distance above the longitudinal rotation centre line of the vehicle.

11. The vehicle according to claim 9, wherein the longitudinal frame member of the transfer frame is pivotally attached to the forward frame member at a distance below the longitudinal rotation centre line of the vehicle.

12. The vehicle according to claim 9, wherein the connection between the footboards and the transfer frame is articulated.

13. The vehicle according to claim 9, wherein there is provided a damping means in connection with the spring means.

14. The vehicle according to claim 9, wherein the spring anchor is located in an upper region of the longitudinal frame member.

15. The vehicle according to claim 9, wherein the attachment of the transfer frame to the main frame can be varied in predefined holes.

16. The vehicle according to claim 9, wherein there is provided one or more spring devices between the main frame and the transfer frame.

* * * * *

UNITED STATES PATENT AND TRADEMARK OFFICE
CERTIFICATE OF CORRECTION

PATENT NO.           : 7,530,419 B2
APPLICATION NO. : 10/563127
DATED                    : May 12, 2009
INVENTOR(S)         : Geir Brudeli It is certified that error appears in the above-identified patent and that said Letters Patent is hereby corrected as shown below:

On the title page, in item (57), line 17, "frazne" should read --frame--.

In claim 2, column 6, line 47, "vehicle to" should read --vehicle according to--.

In claim 9, column 7, line 12, "directional" should read --direction--.

In claim 10, column 7, line 24, "pivotal" should read --pivotally--.

Signed and Sealed this

Sixth Day of October, 2009

David J. Kappos
*Director of the United States Patent and Trademark Office*